United States Patent [19]

Ekbom et al.

[11] Patent Number: 4,485,961
[45] Date of Patent: Dec. 4, 1984

[54] WELDING BY HOT ISOSTATIC PRESSING (HIP)

[75] Inventors: Ragnar Ekbom, Finspong; Tore Garvare, Gammelstad, both of Sweden

[73] Assignee: ASEA Aktiebolag, Västerås, Sweden

[21] Appl. No.: 479,085

[22] Filed: Mar. 25, 1983

[30] Foreign Application Priority Data

Mar. 29, 1982 [SE] Sweden ............................. 8201982

[51] Int. Cl.³ .......................... B23K 20/00; B22F 7/08
[52] U.S. Cl. ..................................... 228/193; 228/243; 228/248; 419/9; 419/49
[58] Field of Search ....................... 228/193, 243, 248; 419/8, 9, 49, 6

[56] References Cited

U.S. PATENT DOCUMENTS

| 3,442,010 | 5/1969 | Albers | 228/248 X |
| 3,465,422 | 9/1969 | Stenerson | 228/248 X |
| 3,716,347 | 2/1973 | Bergstrom et al. | 228/248 X |
| 4,212,669 | 7/1980 | Veeck et al. | 419/6 |
| 4,446,100 | 5/1984 | Adlerborn et al. | 419/48 |

Primary Examiner—Kenneth J. Ramsey
Attorney, Agent, or Firm—Watson, Cole, Grindle & Watson

[57] ABSTRACT

A method of joining together component parts of a solid, preferably metallic, material into a composite element by hot isostatic pressing involves forming the parts so that good contact is obtained between surfaces at a joint where the surfaces are to be joined together. The joint is covered by a layer of a powder or a mixture of powder with substantially the same composition as the material in the different component parts. This powder layer is covered by one or more layers of glass powder, which upon heating forms a gas-impermeable layer. Between the powder layer covering the joint and a glass powder layer nearest to said layer there may be applied an intermediate layer of a powder having a melting point which is above the temperature to be used for the isostatic pressing. The assembly of parts and layers is pressed isostatically in a known manner at such a temperature that diffusion bonding is achieved at the contact surfaces.

12 Claims, 2 Drawing Figures

WELDING BY HOT ISOSTATIC PRESSING (HIP)

BACKGROUND OF THE INVENTION

The invention relates to a method of welding together solid parts into composite machine elements by hot isostatic pressing. It has long been known that a very good bond can be obtained between two solid metal parts by pressing the parts against each other at such a high temperature that bonding is obtained by diffusion of materials at the contact surfaces.

DESCRIPTION OF THE PRIOR ART

Using hot isostatic pressing (HIP) to obtain this bond is known from DMIC Report 159, Sept. 25, 1961 entitled "Gas Pressure Bonding" by S. J. Paprochi, E. S. Hodge and P. I. Gripshover published by the Defence Metals Information Center, Batelle Memorial Institute. This publication gives examples of the joining of parts of materials which cannot—or can only at very high costs—be joined together by conventional welding methods. Gas-tight sheet metal casings have been used and complicated filling devices have been necessary to bring about spaces between different parts of the end product. The methods described have not been particularly well adapted for industrial manufacture of complicated components.

OBJECTS OF THE INVENTION

One object of the present invention is to provide an industrially applicable method of manufacturing composite machine elements by welding together the different component parts by hot isostatic pressing. The method can be employed, for example, for the manufacture of guide vane rings (by welding blades into rings), for the manufacture of turbine wheels (by welding blades into discs), for the assembly of valve housings of several basic components, for the attachment of elements of the fiber composite materials to each other or to a purely metallic material or for bonding wear rings of stellite into valve seats. Many other applications are possible and the above list is purely exemplary of the invention.

SUMMARY OF THE INVENTION

According to the invention, the component parts are formed so that surfaces which are to be joined together are completely or partly in contact with each other. Recesses in rings or discs for guide vanes or rotor blades are suitably given such a size that an interference fit between the component parts is obtained. During insertion, the blades can be cooled to such a low temperature that there is a clearance during the mounting and an interference fit, with the desired contact pressure will be obtained when the blades acquire the same temperature as the rings or the disc. This cooling can be achieved using liquid nitrogen. Over the joint(s) between the component parts there is applied a slurry or a paste consisting of a solvent or softener, capable of being driven off, and a fine-grained metallic powder which may have the same composition as the alloy in one of the parts which are to be joined together. If the parts have different compositions, it is also possible to use a powder mixture consisting of two powders having, respectively, the same compositions as the two alloys in the components to be joined together. The joint and first layer is then covered by a porous layer of glass powder which at a certain elevated temperature below the isostatic pressing temperature will form a gas-impermeable layer, whereafter the composite body is subjected to an all-sided gas pressure at a temperature which is so high that diffusion bonding is obtained at the boundary layer between the component parts. The component parts can be completely surrounded by the glass powder layer. The porous glass layer may also be applied in suspended state in a fluid, for example water or alcohol, or mixed wth a softener. Nearest to the metal powder layer there may be applied a first glass powder layer of a glass having a high melting point and outside this layer a second glass powder layer of a glass having a lower melting point. During heating, the outer glass powder layer is the first to melt and forms a tight, gas-impermeable layer. When the glass in this layer becomes free flowing and tends to run off the body, the glass powder with the higher melting point forms a gas-impermeable layer preventing the isostatic pressurizing gas from penetrating into the joint. The metal powder layer nearest the joint prevents glass from penetrating in between the surfaces which are to be joined together, which would have made the intended bonding impossible. The application of glass layers and isostratic pressing of powder bodies are described in U.S. Pat. No. 4,112,143 (Adlerborn et al—issued Sept. 5, 1978) and U.S. patent application Ser. No. 102,336 filed on Dec. 11, 1979 by Adlerborn et al.

Impurities may at least impair the bond and can even prevent bonding. It is therefore important that the surfaces to be joined are clean. If the parts are correctly formed and prepared, the joint will be as strong as the material constituting those parts. The deterioration of the material in and around the joint which occurs in traditional welding, such as grain growth, segregations and formation of pores is avoided during HIP welding. Dissimilar metals, which cannot otherwise be welded together, can be joined by the method of the invention. The surfaces to be joined should be cleaned before being brought together. For certain metals, it is sufficient for the surfaces to be degreased. For other metals a careful chemical cleaning is required, for example acid washing and/or reduction in nitrogen gas atmosphere at elevated temperature, in order to be able to remove surface coatings, for example oxides, in an efficient manner. Reduction can also be carried out on composite components, the joints of which have been prepared, by effecting the reduction in the pressure furnace in a reducing atmosphere at a temperature below the melting temperature of the glass powder.

If the powder layer closest to the joint consists of a powder having grains smaller than 45 microns, the penetration by the glass into this layer will be of the order of magnitude of one or a few tenths of a millimeter. Normally, penetration on this scale does not deteriorate the strength of the composite material to any mentionable extent. To facilitate the removal of the glass layer after fusing, a powder layer of a difficultly fusible material, such as olivine, a magnesium aluminium silicate having a melting point of 1700° C. to 1800° C., quartz, or some other refractory material, may be applied over the metal powder layer. Olivine is a particularly suitable material since it has the same coefficient of thermal expansion as steel and other materials of interest, for example the superalloys for which the method of the invention can be employed. The similar expansion upon heating implies that no cracks are formed in the layer during the heating. One or more of the powder layers may contain a getter material which, during the heating, absorbs impurities which may be detrimental to the joint being formed and thereby reduce its strength. Another way of facilitating the removal of the glass layer after the isostatic pressing is to coat the innermost powder layer (and other surfaces which may contact the glass) with a layer of boron nitride which prevents the glass from adhering to the metal surfaces.

Since the demands for cleanness of the surfaces to be joined together are great in order to be able to obtain good bonding, where a liquid suspension agent is used to make a paste or slurry, it is desirable that such agent be capable of being driven off completely, without leaving any coating on the surfaces. Alcohols may be used for this purpose.

The parameters of pressure, temperature and time required are dependent on the material(s) used. The prepared component (eg a machine element) may first be degassed at room temperature in a vacuum of between 1 and 0.01 mbar for about 0.5 hours. Such a degassing can be carried out in the pressure furnace. If deoxidation is required, the furnace can be filled with nitrogen gas to atmospheric pressure following the degassing and the temperature can then be increased to a level suitable for the deoxidation. The pressure rises to a level dependent on the temperature and is maintained for one to two hours. For copper alloys, a temperature of about 300° C. may be a suitable temperature, for iron-based alloys a temperature of about 800° C. The temperature is increased to a level at which a dense gas layer is formed, whereafter the pressurizing gas required for the isostatic pressing, for example nitrogen, argon or helium, is supplied to the furnace and the temperature is increased to the level required for the diffusion bond to form. The temperature and the pressure would typically be maintained for from one to several hours for a satisfactory bonding to be obtained. After the isostatic pressing stage is completed, the furnace is allowed to cool to a suitable discharging temperature, the charge is removed and the completed element is cleaned, for example by sand blasting.

If deoxidation by nitrogen gas is not required, the prepared body is suitably degassed at 400° C. or at an even higher temperature under high vacuum. A suitable pressure may be $\sim 10^{-2}$ torr.

A very important advantage of the method of joining according to the invention is that it can be carried out at a temperature considerably below the melting point of the material. This means that the bond can be formed at a temperature where the grain growth is small and other unfavourable changes proceed slowly. The joining can be carried out completely without any supply of additional materials and without the application of gases or other substances which may affect the material.

BRIEF DESCRIPTION OF THE DRAWING

The invention will now be more fully described, by way of example, with reference to the accompanying drawing in which.

DESCRIPTION OF PREFERRED EMBODIMENTS

In both Figures, 1 designates a machine element which is composed of two parts 2 and 3 to be connected at a joint 4, the part 2 being shown inserted into a recess in the part 3.

Figure 1:
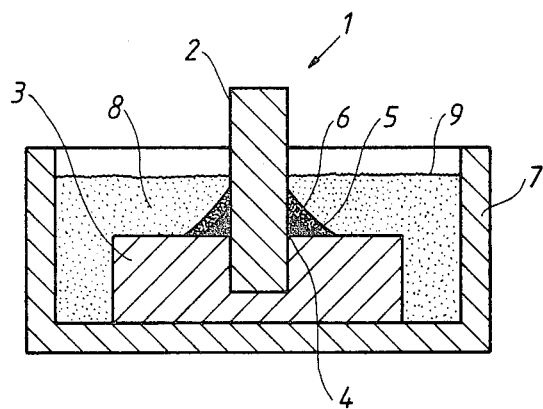
FIG. 1 shows an embodiment in which the prepared component is surrounded by a glass powder in a crucible, and FIG. 2 indicates an embodiment in which protective powder layers are localised to the vicinity of the proposed joint shown prior to treatment in a pressure furnace.

In the embodiment shown in FIG. 1, the joint 4 is covered by a first powder layer 5 consisting of metal powder with a composition similar to that of the material in the part 1 and/or the part 2. On top of this powder layer 5, a layer 6 of olivine power is located. The element 1 is placed in a crucible 7 and is covered with a bed of glass powder 8, the upper level 9 of which lies above the layers 5 and 6 which cover the joint 4. During degassing and deoxidation in nitrogen gas atmosphere, the glass powder bed will allow gas to pass therethrough. As a result of the temperature increase which occurs prior to pressing, the bed of glass powder 8 melts to form a gas impermeable mass which prevents the penetration of pressure gas to the joint during the subsequent pressing.

Figure 2:
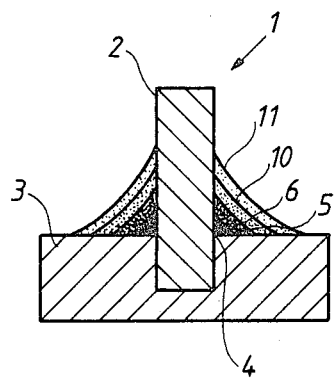

In the embodiment shown in FIG. 2, the powder layers 5 and 6, which contain a metal powder and an olivine powder, respectively, are covered by a first powder layer 10 of a glass having a high melting point and by a second powder layer 11 of a glass having a lower melting point. During heating after degassing, the second glass powder layer 11 melts first and forms a gas-impermeable layer. When the temperature is further increased, the glass in the second layer 11 becomes volatile and flows away, while the powder in the first layer 10 becomes molten and thereby forms a gas-impermeable layer which prevents the penetration of pressure gas during the isostatic pressing.

EXAMPLE

Two parts 2 and 3 of a Cr-Mo-V steel, containing 0.15% C, 0.4% Mn, 11.8% Cr, 0.6% Mo, 0.3% V and the remainder Fe, have been joined together in the manner shown in FIG. 1. The part 2 was machine-turned conically and in the part 3 a conical opening was turned.

The parts were degreased prior to the assembly. The joint 4 was covered by a metal powder layer 5 of a powder having a grain size <44 micron. The thickness of the layer 5 was 2 mm. The machine element formed by the parts 2 and 3 was placed in a crucible 7 which was filled with a glass powder 8 having a low melting point, with the following composition in percentage by weight: 80.3% $SiO_2$, 12.2% $B_2O_3$, 2.8% $Al_2O_3$, 4.0% $Na_2O$, 0.4% $K_2O$ and 0.3% CaO. Degassing was carried out at a temperature of 400° C. and a pressure of $10^{-2}$ torr for 1 hour. The crucible with its contents was then placed in a pressure furnace. The furnace was evacuated twice to a pressure of 1 torr and was flushed between and after these evacuations with pure $N_2$ gas at a pressure of 1 bar. The temperature was then raised to 1150° C., causing the glass powder 8 to melt and form a gas-impermeable mass. The pressure was next raised to 120 MPa using argon gas. The pressure was maintained at 120 MPa and the temperature at 1150° C. for two hours. After allowing the furnace charge to cool to a suitable discharging temperature, the crucible 7 was removed and on breaking away the fused mass of glass surrounding the element 1 it was found that a perfect joint had formed between the parts 1 and 2.

Although the above example has related to the bonding together of metallic parts, the invention is not limited to metallic component parts. The scope of the invention is defined in the following claims.

What is claimed is:

1. A method of joining together component parts of a composite element by hot isostatic pressing (HIP), which is characterised in that the component parts are assembled so that surfaces thereof to be joined together are in contact at at least one joint, in that a first layer of powder having substantially the same composition as the material of at least one of said component parts is applied over the said at least one joint, in that a second layer of a glass powder is applied over the first powder layer in that the assembled component parts and layers are heated so that the second layer of glass powder forms a gas-impermeable barrier over the first layer, and in that the component parts and layers are subjected to an all-sided gas pressure at such an elevated temperature that diffusion bonding occurs at the said at least one joint between the component parts.

2. A method according to claim 1, in which the component parts are made of solid metallic material(s).

3. A method according to claim 2, in which at least the surfaces of the component parts to be joined are degreased prior to assembly.

4. A method according to claim 2, in which after assembly of the layers over the joint and prior to isostatic pressing, the component parts are subjected to a reducing gas atmosphere at an elevated temperature below the melting point of the glass powder.

5. A method according to claim 1 in which two glass powder layer are applied sequentially over the first powder layer and that the glass material in the outer glass powder layer has a lower melting point than the glass material in the underlying glass powder layer.

6. Method according to claim 5, in which each powder layer is applied in the form of a slurry made with a volatile liquid carrier.

7. A method according to claim 1 in which a third powder layer of a material having a melting point which is above the temperature used during the isostatic pressing is applied between the first powder layer and the second powder layer.

8. A method according to claim 7, in which the third powder layer is of a material with a melting point above 1700° C.

9. A method according to claim 8, in which the third powder layer is of olivine.

10. Method according to claim 7, in which each powder layer is applied in the form of a slurry made with a volatile liquid carrier.

11. Method according to claim 1, in which each powder layer is applied in the form of a slurry made with a volatile liquid carrier.

12. A method according to claim 1 in which the composite parts with the first layer of powder over the joint are placed in a crucible and the glass powder, forming the second layer, is filled into the crucible so that the joint and the first layer are covered thereby.

* * * * *